(12) United States Patent
Kisiel

(10) Patent No.: US 6,533,441 B2
(45) Date of Patent: Mar. 18, 2003

(54) AIRCRAFT LANDING LIGHT ASSEMBLY WITH RESILIENT VIBRATION DAMPENING MOUNTING SYSTEM

(76) Inventor: Henry J. Kisiel, 9091 Creek Rd., Batavia, NY (US) 14020

( * ) Notice: Subject to any disclaimer, the term of this patent is extended or adjusted under 35 U.S.C. 154(b) by 0 days.

(21) Appl. No.: 09/907,079

(22) Filed: Jul. 17, 2001

(65) Prior Publication Data
US 2003/0016541 A1 Jan. 23, 2003

(51) Int. Cl.[7] .................................................. G05F 1/00
(52) U.S. Cl. ..................... 362/470; 362/472; 362/369; 362/306; 362/267; 362/549
(58) Field of Search ................. 362/470, 472, 362/369, 549, 390, 267, 306; 248/635

(56) References Cited

U.S. PATENT DOCUMENTS

| | | | |
|---|---|---|---|
| 2,814,722 A | 11/1957 | Diedring | |
| 2,910,577 A | 10/1959 | Bolmeyer | |
| 3,636,343 A | 1/1972 | Martin | |
| 3,757,109 A | 9/1973 | Knecht et al. | |
| 4,282,566 A | 8/1981 | Newman | |
| 4,356,539 A | 10/1982 | Shanks | |
| 4,422,136 A | 12/1983 | Newman et al. | |
| 4,425,813 A | * 1/1984 | Wadensten | 248/635 |
| 4,965,703 A | 10/1990 | Whalen | |
| 4,967,328 A | 10/1990 | Tatavoosian | |
| 5,644,189 A | 7/1997 | Busby | |
| 6,191,541 B1 | * 2/2002 | Patel et al. | 315/307 |

* cited by examiner

Primary Examiner—Sandra O'Shea
(74) Attorney, Agent, or Firm—Jaeckle Fleischmann & Mugel, LLP; Laurence S. Roach, Esq.

(57) ABSTRACT

An aircraft landing light assembly having a resilient vibration dampening mounting system for absorbing propeller and engine induced fuselage vibrations and the like for preventing premature vibrational induced lamp failure. Light assembly includes forward and rear rings that engage opposite faces of the rim of a sealed beam lamp located between the two rings. A resilient O-ring sits in the forward ring. Four cylindrically-shaped shock damper mounts sit in tapered wells on the back of the rear ring for protecting the sealed beam lamp from premature vibrational lamp failure, as well as for fastening the light assembly together and to the aircraft mounting bracket. Shock damper mounts include an enlarged cylindrically-shaped resilient damper material having a threaded headless screw located on each end.

8 Claims, 5 Drawing Sheets

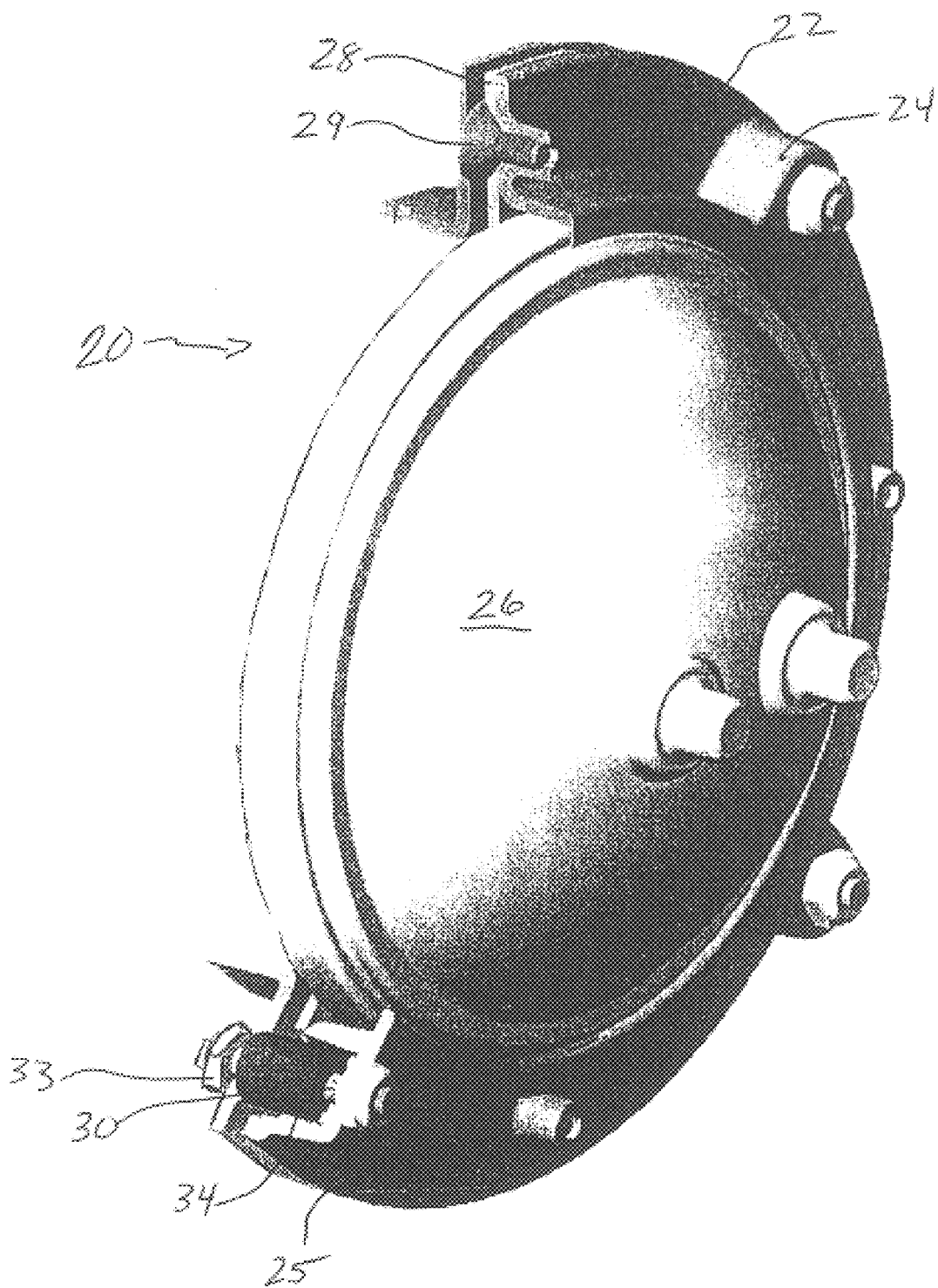

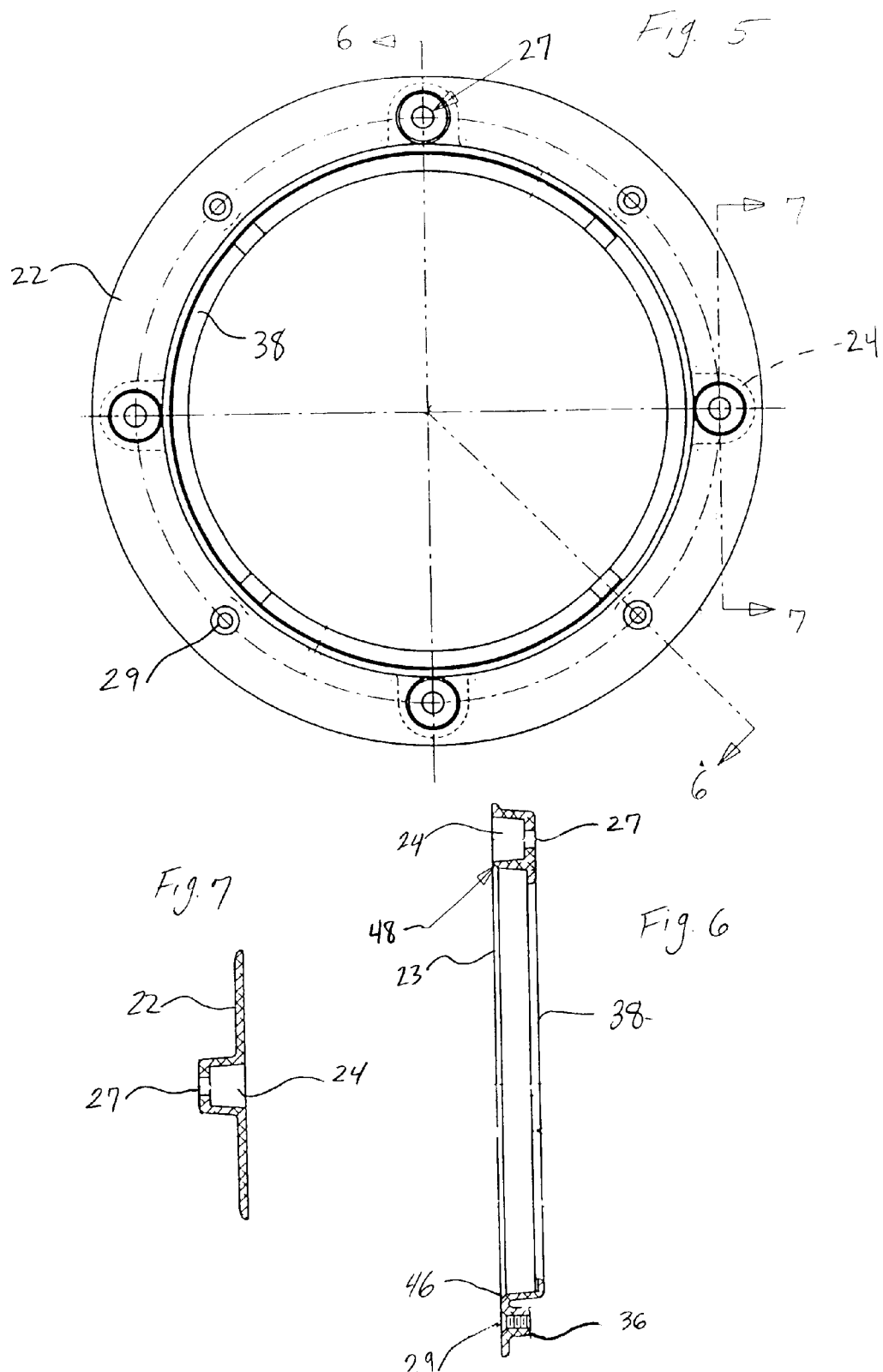

AIRCRAFT LANDING LIGHT ASSEMBLY WITH RESILIENT VIBRATION DAMPENING MOUNTING SYSTEM

TECHNICAL FIELD

The present invention relates to light assemblies, and in particular, to aircraft landing light assemblies having a resilient vibration dampening mounting system for preventing premature vibration induced lamp failures.

BACKGROUND OF THE INVENTION

A common problem associated with aircraft landing lights pertains to vibration induced premature lamp failure. The premature failure of aircraft landing lights posses significant safety issues to aircraft, air traffic controllers and ground crew unable to see a plane exhibiting this problem, and to pilots having difficulty landing the plane because of diminished visibility of the runway.

Premature lamp failure also results in significant economic affects in addition to the serious safety concerns. Aircraft landing lights are costly to replace, and are typically built to last for about two-three years. However, because of vibration induced premature lamp failure, aircraft landing lights typically need to be replaced every two to three months instead of every two to three years.

When mounted onto an operating propellor driven aircraft, landing lights experience excessive vibrations and stress from many directions. The inventor has discovered that one of the primary causes of premature lamp failures in aircraft landing lights is caused by engine and propeller induced vibrations in the plane's fuselage that are transmitted to lamps contained within landing light assemblies. The effect of engine and propeller induced vibrations becomes more severe the closer the lights are located to the propellor. Vibration dampening systems disclosed in the prior art generally do not provide for adequate dampening of vibrational forces that contribute to premature vibration induced lamp failure, and therefore are limited in their over-all effectiveness for this purpose.

To dampen vibrations, lamp assemblies in the prior art have used stiff metal supports, springs, and resilient materials for engaging mounted lamp assemblies. An exemplary prior art embodiment includes U.S. Pat. No. 4,282,566 to Newman, wherein a shock mounting bracket for a vehicle lamp bulb has a serpentine strip with a centrally located bulb-receiving socket which engages the base of the bulb. Other exemplary prior art lamp assemblies having vibration dampening features are illustrated in U.S. Pat. No. 3,065,342 to Worden and U.S. Pat. No. 5,491,619 to Gill. Both Worden and Gill use resilient grommets located between the light assembly and the mounting assembly to provide some shock resistance to the lamp bodies contained therein.

Vibration dampening systems such as those disclosed in Newman are limited by their engagement of a lamp socket or the base of a lamp bulb to reduce vibratory effects. While vibration dampening systems that rely on resilient grommets such as those disclosed in Gill and Worden are held in place by compression forces, whereby the resiliency of the grommets is limited to only a portion of what would be expected had the grommets been held in place in an uncompressed state.

Current vibration dampening systems used in aircraft landing lights and the like are generally ineffective in preventing damage, and eventual failure of the lamps contained therein, and may actually enhance the premature failure of the lamps by directly transmitting vibratory loads to the lamps, rather than sufficiently dampening them.

What is needed is an improved aircraft light mounting system capable of dampening vibrations transmitted to lamps located therein in order to prevent premature vibrational induced lamp failure. Current vibration dampening systems are ineffective in reducing vibration induced lamp failures in aircraft landing lights. The present invention is the result of an attempt to meet this need, and overcome the drawbacks associated with current vibration dampening systems. None of the art which applicant is aware of describes aircraft landing light assemblies having a resilient vibration dampening mounting system that prevents premature vibration induced lamp failure as disclosed and claimed herein.

SUMMARY OF THE INVENTION

Accordingly, it is a principal object of the present invention to provide an aircraft landing light assembly having a resilient vibration dampening mounting system for absorbing propeller and engine induced fuselage vibrations, thereby protecting the lamp contained within the light assembly from premature vibration induced lamp failure.

The light assembly includes a forward ring and a rear ring that engage opposite faces of the rim of a sealed beam lamp located between the two rings. A resilient O-ring sits in a chamfer in the forward ring to keep the sealed beam lamp in place. There are preferably four cylindrically-shaped shock damper mounts that protect the sealed beam lamp from premature vibrational lamp failure, and also fasten the light assembly components together and to an aircraft mounting bracket. Each mount includes an enlarged cylindrically-shaped resilient shock damper material having a threaded headless screw located on each end of the cylindrical. Each shock damper sits in a tapered well on the back of the rear ring and prevents vibrations from a plane's fuselage from being transmitted to the sealed beam lamp.

An object of the present invention is to provide a light assembly which dampens vibrations to the lamp disposed therein in all directions.

A further object of the present invention is to provide a light assembly which prevents vibration induced damage and the premature failure of lamps disposed therein, thereby effectively extending the life of the lamp.

Another object of this invention is to provide a light assembly useful in aircraft landing lights.

It is also an object of the present invention to provide a light assembly that includes a resilient mount system that dampens vibrations by absorption of the vibrations, and by deformation of the resilient mount body.

It is a further object of this invention to provide improved elements and arrangements thereof for the purposes described which are inexpensive, dependable and fully effective in accomplishing its intended purposes, and capable of overcoming the above identified problems associated with prior art applicators.

These and other objects of the present invention will become readily apparent upon further review of the following specification and drawing.

BRIEF DESCRIPTION OF THE DRAWINGS

The invention will be described in greater detail with reference to the accompanying drawings, which illustrate preferred embodiments of the invention, and wherein:

FIGS. 4A and 4B depict sectional views taken along line 4—4 in FIG. 3;

FIG. 5 depicts a top plan view of a rear shock mount and lamp housing ring of the light assembly in accordance with one embodiment of the present invention;

FIG. 6 depicts a cross-sectional view taken along line 6—6 in FIG. 5;

FIG. 7 depicts a cross-sectional view taken along line 7—7 in FIG. 5; and

Corresponding reference characters indicate corresponding parts throughout the several views. The examples set out herein illustrate preferred embodiments of the invention, in one form, and such examples are not to be construed as limiting the scope of the invention in any manner.

DESCRIPTION OF THE PREFERRED EMBODIMENTS

Figure 1:
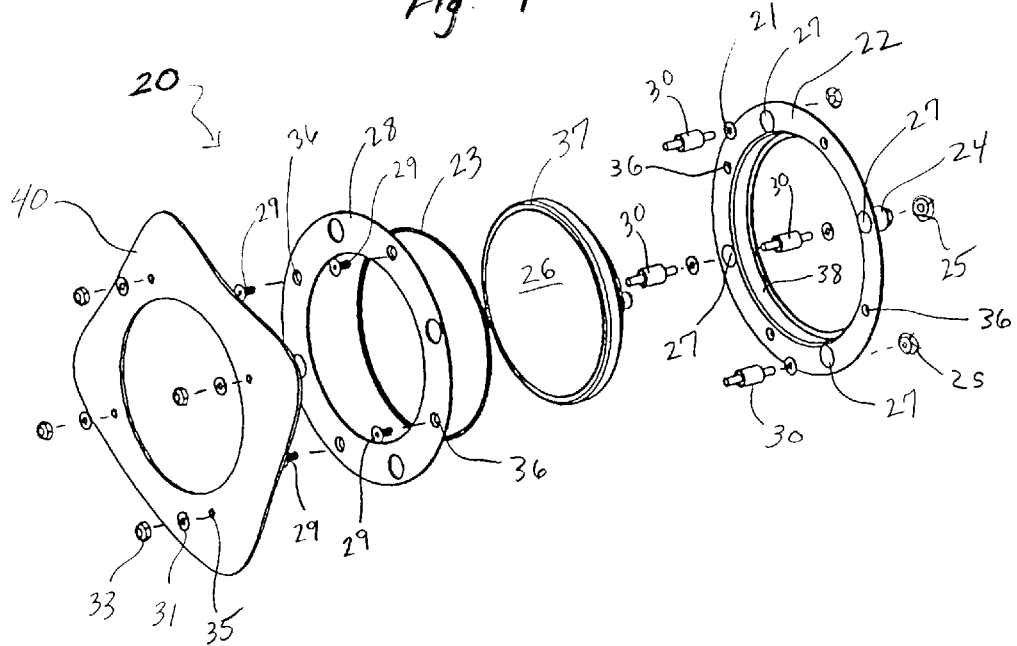
FIG. 1 depicts an exploded view of a light assembly in accordance with one embodiment of the present invention.
Figure 2A:
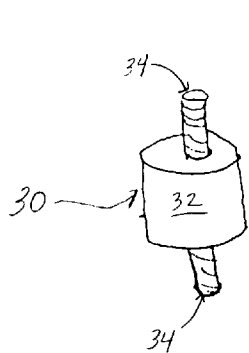
FIG. 2a depicts a detailed view of the mount depicted in FIG. 1.
Figure 2B:
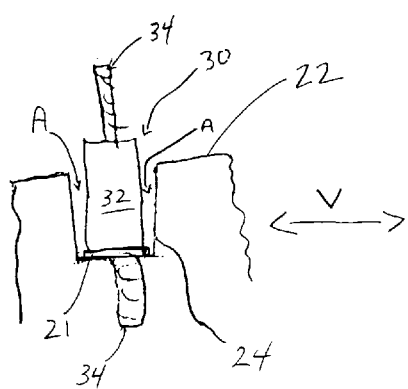
FIG. 2b depicts a detailed cutaway side view of the mount disposed within the well depicted in FIG. 1.
Figure 3:
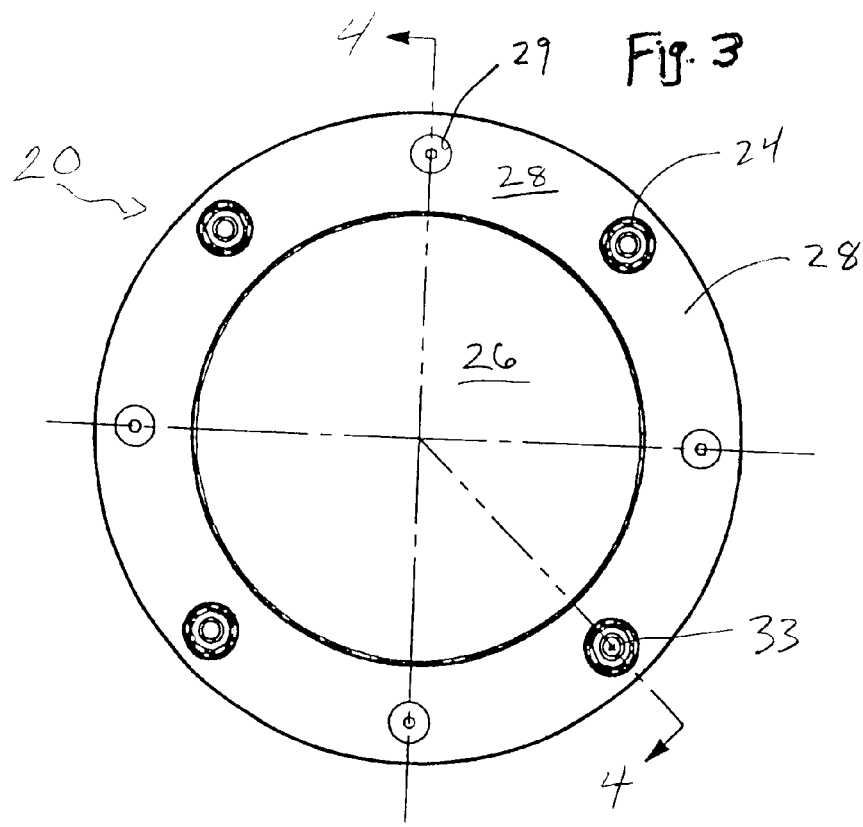
FIG. 3 depicts a top plan view of the light assembly in accordance with one embodiment of the present invention.
Figure 4A:
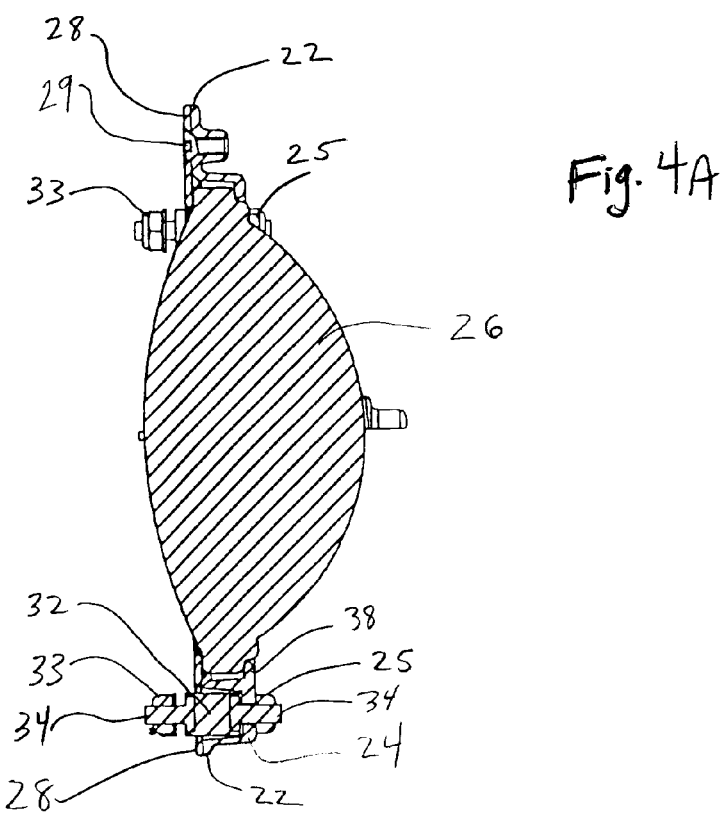
Figure 8:
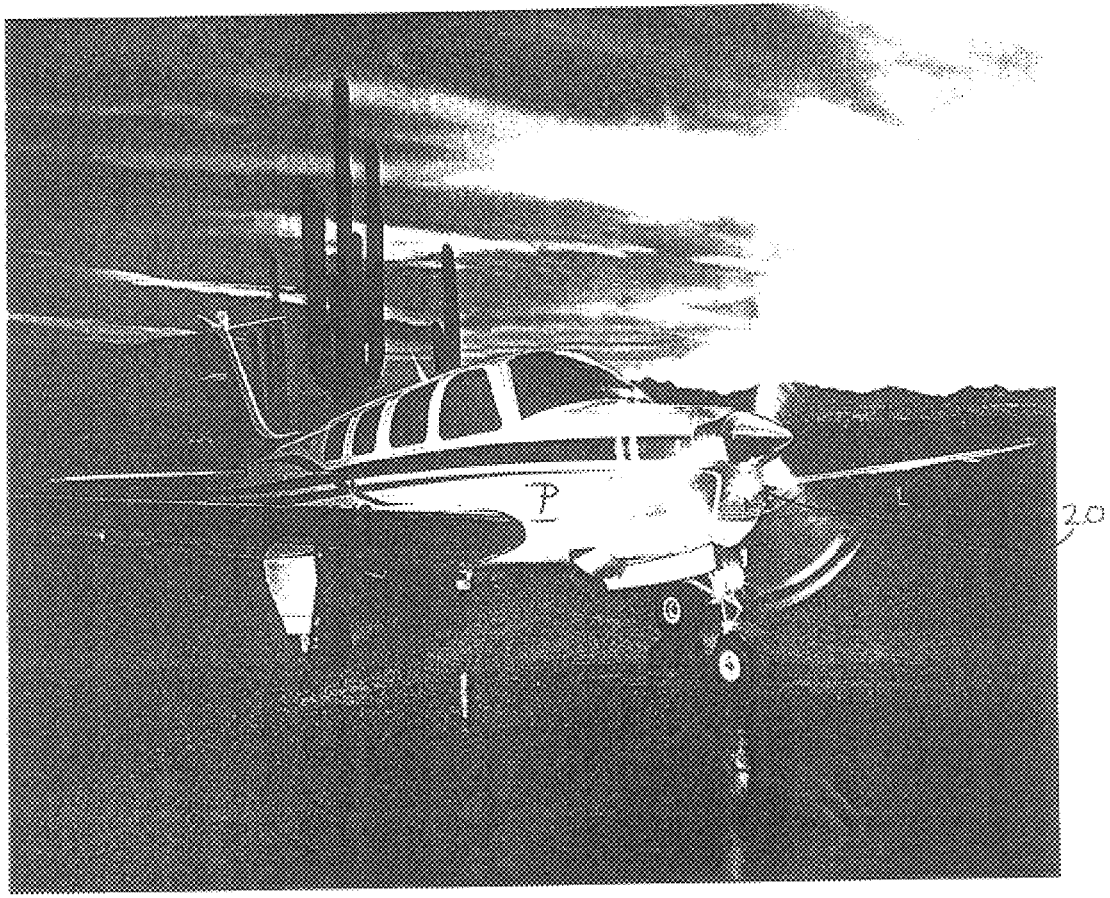
FIG. 8 depicts an environmental view of the light assembly in accordance with one embodiment of the present invention mounted on a plane's fuselage.

With reference to FIGS. 1–8, an aircraft landing light assembly having a resilient vibration dampening mounting system of the present invention is referred to generally by reference numeral "20", (hereinafter referred to as "light assembly" or simply "assembly").

As depicted in FIG. 1, light assembly 20 includes a forward clamp ring 28 and a rear shock mount and lamp housing ring 22 that engage opposite faces of the rim 37 of sealed beam lamp 26 located between rings 22,28. Rear ring 22 includes an inner walled lip 38 for seating lamp 26 thereon (shown in FIGS. 5 and 6). A resilient O-ring 23 sits in chamfer 48 (shown in FIG. 6) in rear ring 22 to keep sealed beam lamp 26 securely in place. Resilient O-ring 23 also provides flexibility and shock absorbency along the fore-aft axis of assembly 20. Rings 22,28 are preferably held together by four flat head screws 29 received in holes 36 located on rings 22,28. There are preferably four resilient cylindrically-shaped shock damper mounts 30 that provide assembly 20 with protection against premature vibration induced lamp failure, and also fasten light assembly 20 components to an aircraft mounting bracket or flange 40 in order to attach assembly 20 to the plane's fuselage P (shown in FIG. 8).

Resilient damper mounts 30 include an enlarged cylindrically-shaped resilient shock damper material body 32 (shown in FIGS. 2a and 2b) for dampening vibrations and absorbing shocks, thereby protecting lamp 26 disposed within light assembly 20 from premature vibration induced lamp failure. Each resilient damper mount 30 is disposed in a tapered well 24 (shown in FIGS. 2b and 7) on the back of rear ring 22. Resilient mounts 30 substantially conform in shape and size to the interior surface of tapered wells 24. Air clearance zone A (depicted in FIG. 2b), located between the side periphery of shock mounts 30 and the corresponding well 24 it is disposed within, enables mount 30 to have considerable play in the plane normal to its axis line in accordance with the predominant mode of stress and vibration occurring in the aircraft's fuselage. Since most of the vibrations V (depicted as a parallel arrow in FIG. 2b) from the fuselage occur in a plane parallel to rings 22,28, the resilient cylindrically-shaped outer surfaces 32 of damper mounts 30 deform and absorb these vibrations, thereby preventing premature vibration induced lamp failure of seal beam lamp 26. The resilient and deformable nature of shock mounts 30, as well as the presence of clearance zone A (depicted in FIG. 2b) between mount 30 and its surrounding well 24 permits flexibility and motion of mount 30 along their axes, in response to compression and tension forces, and laterally, in response to bending and shear forces encountered.

FIGS. 1, 3, 4A and 4B depict resilient mount 30 held in place by locking nuts 25,33 threadably attached to threaded headless screws 34 located on each end of the resilient cylindrically-shaped body 32. Internal locking washers 21 are preferably located between mounts 30 and wells 27. Locking nut 25 screws onto the end of the headless screw 34 that extends through hole 27 in well 24. Locking nut 33 screws onto the other end of mount 30 that runs through mounting hole 35 on fuselage bracket 40. Flat washers 21 are preferably located between locking nuts 33 and holes 35. Because threaded bolt shafts 34 on each side of mount 30 are independent of each other and separated by cylindrically-shaped resilient material 32, no appreciable vibrational forces are transmitted from the fuselage to lamp 26 within light assembly 20.

Rings 22,28 are preferably formed from die cast or extruded aluminum.

Shock mounts 30 and the O-ring 23 are formed of any suitably resilient material, such as rubber or an elastomer like neoprene, that is also capable of operating under the severe environmental conditions encountered by an aircraft, including, but not limited to, extremes of heat and cold, forces exerted by freezing water, exposure to deicer fluid, high levels of vibration and shock during takeoffs and landings, and transient exposure to electric discharge.

While the invention has been described with reference to preferred embodiments, it will be understood by those skilled in the art that various changes may be made and equivalents may be substituted for elements thereof without departing from the scope of the invention. The present invention is not limited by the type of sealed beam lamp utilized and to aircraft landing light assemblies, and may be adapted for use with a variety of lamps and lamp assemblies in addition to aircraft usage. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed:

1. A light assembly having a resilient vibration dampening mounting system for mounting a lamp, comprising:
    a forward clamp ring;
    a rear lamp housing ring having a receiving well with a side wall and a bottom wall;
    a lamp body located between said forward ring and said rear ring; and
    vibration dampening means disposed between said forward ring and said rear ring resiliently connecting the rings, said vibration dampening means protecting said lamp body from premature vibration induced lamp failure, said vibration dampening means comprising a resilient mount, said mount comprising a cylindrically-shaped resilient body having a side periphery region, a top region and a bottom region, a respective threaded attachment means attached to said top and said bottom regions, at least a portion of said side periphery region being disposed in said receiving well.

2. A light assembly having a resilient vibration dampening mounting system for mounting a lamp, comprising:

a forward clamp ring;

a rear lamp housing ring having a receiving well with a side wall and a bottom wall;

a lamp body located between said forward ring and said rear ring; and vibration dampening means disposed between said forward ring and said rear ring resiliently connecting the rings, said vibration dampening means protecting said lamp body from premature vibration induced lamp failure, said vibration dampening means comprising a resilient mount, said mount comprising a cylindrically-shaped resilient body having a side periphery region, a top region and a bottom region, a respective threaded attachment means attached to said top and said bottom regions, at least a portion of said side periphery region being disposed in said receiving well, an air clearance zone is formed between the side periphery of said mount and the side wall of said well.

3. The light assembly according to claim 1, wherein said rear ring further comprises an inner walled lip for seating said lamp thereon.

4. A light assembly having a resilient vibration dampening mounting system for mounting a lamp, comprising:

a forward clamp ring;

a rear lamp housing ring having a receiving well with a side wall and a bottom wall, said rear ring further comprises a chamfer;

a lamp body located between said forward ring and said rear ring; and vibration dampening means disposed between said forward ring and said rear ring resiliently connecting the rings, said vibration dampening means protecting said lamp body from premature vibration induced lamp failure.

5. The light assembly according to claim 4 further comprising a resilient O-ring located in the camfer in said rear ring to further protect said lamp body from vibrations.

6. The light assembly according to claim 1, further comprising fastening means for joining said front ring and said rear ring.

7. The light assembly according to claim 1, wherein said light assembly is an aircraft landing light assembly.

8. The light assembly according to claim 7, wherein said aircraft landing light assembly is attached to the fuselage of an airplane by an aircraft mounting bracket.

* * * * *